United States Patent
Green et al.

(10) Patent No.: US 8,155,018 B2
(45) Date of Patent: Apr. 10, 2012

(54) IMPLEMENTING LOCATION AWARENESS IN WLAN DEVICES

(75) Inventors: Michael R. Green, Needham, MA (US); Yi-Hsiu Wang, Palo Alto, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 678 days.

(21) Appl. No.: 12/264,148

(22) Filed: Nov. 3, 2008

(65) Prior Publication Data

US 2009/0067398 A1 Mar. 12, 2009

Related U.S. Application Data

(63) Continuation-in-part of application No. 12/027,253, filed on Feb. 6, 2008, which is a continuation of application No. 10/875,976, filed on Jun. 23, 2004, now Pat. No. 7,352,733.

(60) Provisional application No. 60/550,000, filed on Mar. 3, 2004.

(51) Int. Cl.
*H04L 12/26* (2006.01)
*H04W 4/00* (2009.01)
*H04W 24/00* (2009.01)

(52) U.S. Cl. ............... 370/252; 370/329; 370/395.2; 455/456.3; 455/456.6; 455/160.1

(58) Field of Classification Search ................ None
See application file for complete search history.

(56) References Cited

U.S. PATENT DOCUMENTS

| | | |
|---|---|---|
| 4,959,631 A | 9/1990 | Hasegawa et al. |
| 5,066,925 A | 11/1991 | Freitag |
| 5,289,055 A | 2/1994 | Razavi |
| 5,298,810 A | 3/1994 | Scott et al. |
| 5,656,937 A | 8/1997 | Cantor |

(Continued)

FOREIGN PATENT DOCUMENTS

EP 0599517 A2 6/1994

OTHER PUBLICATIONS

Burghartz, et al., "RF Circuit Design Aspects of Spiral Inductors on Silicon", IEEE Journal of Solid-State Circuits, vol. 33. No. 12, Dec. 1998, pp. 2028-2034.

(Continued)

*Primary Examiner* — Gregory Sefcheck
*Assistant Examiner* — Ashley Shivers
(74) *Attorney, Agent, or Firm* — Bever, Hoffman & Harms, LLP

(57) ABSTRACT

A set of global location signals, an SBAS (Satellite Based Augmentation System), or an ACI (ambient country identifier) signal can be used to automatically provide location awareness for a WLAN device. If one of the set of global location signals, the SBAS signal, or the ACI signal is detected, then the WLAN device can configure itself to comply with channel and power settings for the country/region having the detected signal(s). After configuration, the WLAN device can be "locked" to the country/region having the signal (s), thereby ensuring legal operation of the WLAN device even after subsequent restarts. If one of the signals is not detected, then the WLAN device can be configured in a default mode, e.g. an "open mode" in which end users can configure the WLAN device by entering a country of operation or a "common mode" in which the channel and transmit power settings meet global spectrum usage requirements.

38 Claims, 2 Drawing Sheets

U.S. PATENT DOCUMENTS

| | | | |
|---|---|---|---|
| 5,804,993 A | 9/1998 | Suzuki | |
| 5,884,990 A | 3/1999 | Burghartz et al. | |
| 6,069,502 A | 5/2000 | Preslar et al. | |
| 6,124,741 A | 9/2000 | Arcus | |
| 6,211,721 B1 | 4/2001 | Smetana | |
| 6,229,344 B1 | 5/2001 | Warwar | |
| 6,239,646 B1 | 5/2001 | Navabi et al. | |
| 6,342,813 B1 | 1/2002 | Imbornone et al. | |
| 6,385,214 B1 | 5/2002 | Kikuchi et al. | |
| 6,411,168 B2 | 6/2002 | Yoshida | |
| 6,424,816 B1 | 7/2002 | Stephens | |
| 6,483,358 B2 | 11/2002 | Ingino, Jr. | |
| 6,484,029 B2 | 11/2002 | Hughes et al. | |
| 6,526,264 B2 | 2/2003 | Sugar et al. | |
| 6,556,416 B2 | 4/2003 | Kunihiro | |
| 6,574,266 B1 | 6/2003 | Haartsen | |
| 6,586,976 B2 | 7/2003 | Yang | |
| 6,597,212 B1 | 7/2003 | Wang et al. | |
| 6,621,312 B2 | 9/2003 | Bassett et al. | |
| 6,720,818 B1 | 4/2004 | Liu et al. | |
| 6,829,311 B1 | 12/2004 | Riley | |
| 6,836,156 B2 | 12/2004 | Chien | |
| 6,882,226 B2 | 4/2005 | Cho et al. | |
| 6,943,606 B2 | 9/2005 | Dunning et al. | |
| 6,943,658 B2 | 9/2005 | Gardner | |
| 6,956,417 B2 | 10/2005 | Bernstein et al. | |
| 6,977,531 B2 | 12/2005 | Chien | |
| 7,006,837 B2 | 2/2006 | Shiota et al. | |
| 7,023,316 B2 | 4/2006 | Ahn et al. | |
| 7,030,725 B2 | 4/2006 | Ahn et al. | |
| 7,078,949 B2 | 7/2006 | Kim et al. | |
| 7,260,395 B1 | 8/2007 | Hughes et al. | |
| 2002/0173272 A1 | 11/2002 | Liang et al. | |
| 2002/0191572 A1 | 12/2002 | Weinstein et al. | |
| 2002/0198001 A1* | 12/2002 | Bajikar | 455/456 |
| 2003/0158922 A1 | 8/2003 | Park | |
| 2003/0184403 A1 | 10/2003 | Goyette et al. | |
| 2004/0022326 A1 | 2/2004 | Moorish et al. | |
| 2004/0039817 A1* | 2/2004 | Lee et al. | 709/225 |
| 2004/0176024 A1 | 9/2004 | Hsu et al. | |
| 2004/0198279 A1 | 10/2004 | Anttila et al. | |
| 2004/0248585 A1* | 12/2004 | Karacaoglu | 455/456.1 |
| 2005/0037754 A1 | 2/2005 | Liu et al. | |
| 2006/0098593 A1 | 5/2006 | Edvardsen et al. | |
| 2006/0105785 A1 | 5/2006 | Gfeller et al. | |
| 2006/0215621 A1* | 9/2006 | Abdel-Kader et al. | 370/338 |
| 2008/0037490 A1 | 2/2008 | Hughes et al. | |

OTHER PUBLICATIONS

Cranickx, Jan and Michiel S. J. Steyaert "A 1.75-GHz/3-V Dual Modulus Divide-by-128/129 Prescaler in 0.7-um COMOS", IEEE Journal of Solid-State Circuits, vol. 31, No. 7, Jul. 1996, pp. 890-897.

Greenhouse: "Design Of Planar Rectangular Microelectronic Inductors", IEEE Transactions On Parts, Hybrids, and Packaging, vol. PHP-10, No. 2, Jun. 1974, pp. 101-109.

International Search Report and Written Opinion—PCT/US2005/005527, ISA/US, Oct. 2, 2006 (112023WO).

Yue et al.: "Design Strategy of On-Chip Inductors for Highly Integrated RF Systems", Invited Paper, DAC New Orleans, LA 1999 ACM 1-58113-092-9/99/0006, pp. 982-987.

* cited by examiner

IMPLEMENTING LOCATION AWARENESS IN WLAN DEVICES

RELATED APPLICATIONS

This application is a continuation-in-part of U.S. patent application Ser. No. 12/027,253, entitled "Implementing Location Awareness In WLAN Devices" filed Feb. 6, 2008 which is a continuation of U.S. patent application Ser. No. 10/875,976, entitled "Implementing Location Awareness In WLAN Devices" filed Jun. 23, 2004 which claims priority of U.S. Provisional Patent Application 60/550,000, entitled "System And Method For Communication" filed Mar. 3, 2004.

BACKGROUND OF THE INVENTION

1. Field of the Invention

The present invention relates to wireless local area network (WLAN) devices and in particular to implementing location awareness in such WLAN devices.

2. Description of the Related Art

Wireless local area networks (WLANs) are becoming increasingly popular as communication networks in many countries. Different countries can have different channel restrictions and/or power requirements for WLAN operation. To receive a certification from a country's spectrum regulator, e.g. the FCC in the U.S., a manufacturer must ensure that its WLAN devices can be configured to operate in the correct channel and power setting for that country. Allowing certification of frequency-selectable WLAN devices, thereby allowing a WLAN device to be configured for operation in multiple countries, would reduce production, testing, distribution, and stocking costs. This lower manufacturer cost should increase competition, and, ultimately, lower prices of the WLAN devices, thereby benefiting consumers.

Unfortunately, configuring a frequency-selectable WLAN device may be too tedious, time consuming, and/or challenging for end users to perform, thereby potentially resulting in the WLAN device operating on an illegal channel or at an illegal power level. To solve this problem, some access points provide a configuration software/menu that allows the end user to simply choose the country of operation. However, end users wishing to enable operation across a larger number of channels than legally allowed may opt to use an alternate country setting in the access point that will enable operation in additional channels at higher, but illegal, transmit power levels. Additionally, illegally imported access points may operate on channels that are illegal in the country of operation.

To further complicate WLAN operation enforcement, current IEEE standards, e.g. 802.11d and 802.11h, allow a WLAN client to be automatically configured by a country setting transmitted by its associated WLAN access point. Thus, if an access point is not configured to transmit the correct country information (whether intentionally or unintentionally), then not only the access point but also its associated clients may operate on channels illegal in the country of operation.

One solution for meeting the requirements of a spectrum regulator is to permanently configure an access point to conform to that country's channel and power settings. However, from a vendor's perspective, more "stock kit units" (SKUs), i.e. different versions of a product, are typically undesirable.

Another solution for meeting the requirements of a spectrum regulator is to implement additional radio hardware/software, e.g. a GPS receiver, to incorporate geo-location capability in the access point. With advancements in GPS signal processing techniques and reduced hardware costs, implementing a low-cost, specialized GPS feature in WLAN access points is now feasible. Although GPS signals are transmitted at different frequencies than WLAN devices, an access point could implement a separate, specialized, receive antenna for the GPS signals, thereby enabling an improved solution. GPS signals may not be received reliably indoors, which is where an access point is typically located.

Notably, as described below in accordance with the present invention, advancements in GPS technology specially adapted for a fixed location awareness application in access points may now be feasible when implemented using algorithms that can take advantage of access point startup routines and occasional recheck periods without hindering normal access point operation. Specifically, an improved solution for implementing location awareness in WLAN devices can be implemented by taking advantage of an ambient country identifier (ACI) technique in combination with new GPS capability in the same access point.

SUMMARY OF THE INVENTION

A method to automatically provide improved location awareness for a WLAN device is provided. In this method, a first scan for a set of global location signals can be performed. Global location signals can be provided by GPS (Global Positioning System, developed and maintained by the United States), GLOSNASS (developed and being restored to operation by Russia), GALILEO (currently being developed by Europe), COMPASS (proposed by China), IRNSS (proposed by India), or any other system providing global satellite coverage. In one embodiment, the first scan can be performed using a set of global location signals from one system providing global satellite coverage (e.g. GPS).

If the first scan detects the set of global location signals, then the WLAN device can be configured for compliance with a country having the set of global location signals. If the first scan fails to detect the set of global location signals, then the WLAN device can perform a second, longer scan for the set of global location signals, an SBAS (Satellite Based Augmentation System) signal, and an ACI (ambient country identifier) signal.

Exemplary SBAS signals can include, but are not limited to, WAAS, EGNOS, or MSAS. WAAS (Wide Area Augmentation System) was developed by the Federal Aviation Administration to augment GPS using both satellites and ground stations. WAAS can provide location data regarding most of the contiguous United States, Alaska, and most of Canada. Comparable SBASs can be found in Europe (i.e. EGNOS, European Geostationary Navigation Overlay Service, which was developed to augment GPS and GLONASS) and Japan (i.e. MSAS, Multi-functional Satellite Augmentation System, which was developed to augment GPS)). In the U.S., an exemplary ACI signal is a Digital Audio Radio Service (DARS) signal. Notably, DARS signals in the relevant frequency bands are not present in Europe or Asia and no other country operates this service in the relevant frequency bands. If at least one of the set of global location signals, the SBAS signal, and the ACI signal are detected during the second scan, then the WLAN device can be configured for the appropriate country/region.

When the WLAN device cannot determine a country or region of operation using at least one of the set of global location signals, the SBAS signal, and the ACI signal, the WLAN device can be configured for a default mode (e.g. a common mode or an open mode). A detailed description of the default mode is provided later in this document. In one embodiment of a default mode, the end user operating the WLAN device can be instructed to relocate and then power up the WLAN device again.

After configuration (i.e. country, region, or default), the WLAN device can be "locked". This locking can include programming non-volatile memory of the WLAN device to retain the current channel and power settings. This locking can also include initiating a protocol required by the country/region. Such a protocol could include enabling radar detection. This locking can also include overriding any end user commands that could be inconsistent with regulations of the country/region. Overriding end user commands could include disabling ad-hoc operation of the WLAN device in a predetermined frequency band.

Once in a default mode, a signal recheck technique can be performed at regular intervals (e.g. on the order of every 12 hours). In one embodiment, to minimize impact to standard operation of the WLAN device, a scan for the set of global location signals, the SBAS signal, and the ACI signal can be performed during a low-utilization period. If at least one of the set of global location signals, the SBAS signal, and the ACI signal is detected and the channel associated with the signal(s) is different than the current channel, then the WLAN device can be configured for compliance with the corresponding country/region. When a change from the current channel is not needed (e.g. if the set of global location signals, the SBAS signal, or the ACI signal is not detected), then the WLAN device can continue operation in its current mode.

This signal recheck technique can advantageously prevent an end user from intentionally initializing the WLAN device in a location known to have inadequate reception of the location signals or perhaps removing the transmit antenna of the WLAN device, thereby defeating the automatic configuration of the WLAN device. This signal recheck technique can also improve performance of a WLAN device that is initially configured for the common mode. That is, once one of the set of global location signals, the SBAS signal, or the ACI signal is detected, the channel and power settings of the actual country/region of operation can be used, which generally provide for additional channels and higher power settings.

A computer-readable medium storing a software program for automatically providing location awareness for a WLAN device is also described. The software program can include computer-executable instructions for performing the above-described scans. If at least one of the global location signals, the SBAS signal, and the ACI signal is detected, then the software program can also include instructions for configuring the WLAN device for the appropriate country/region. If at least one of the global location signals, the SBAS signal, and the ACI signal is not detected, then the software program can also include computer-executable instructions for configuring the WLAN device for a default mode.

DETAILED DESCRIPTION OF THE DRAWINGS

Figure 1:
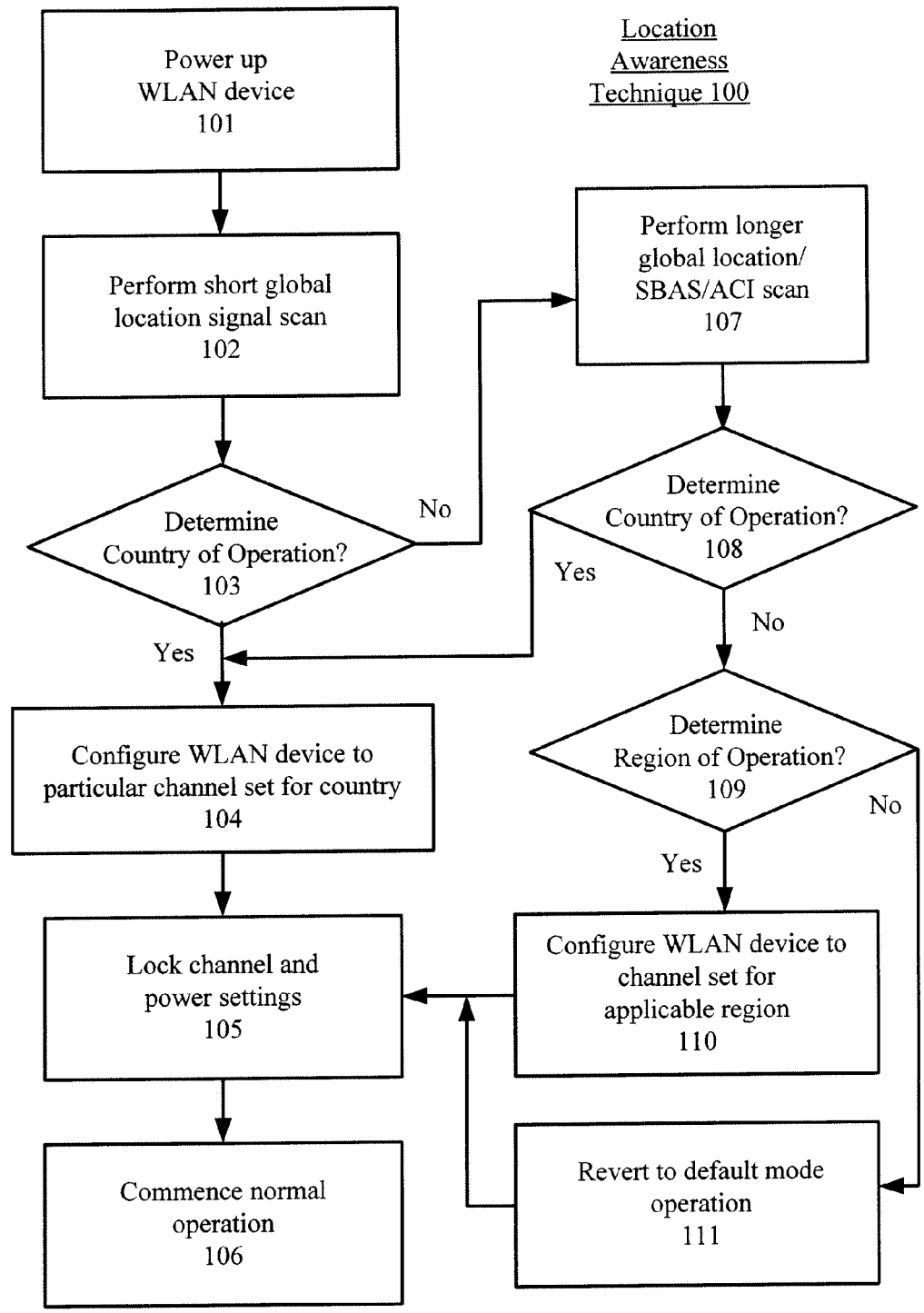
FIG. 1 illustrates a location awareness technique for using an ambient country identifier (ACI) signal to automatically provide a country of operation indicator for a WLAN device.

To provide improved location awareness for a WLAN, global location signals and other unique radio signals uniquely present in a country/region at a frequency within range of current WLAN receivers can be used to identify the country/region of operation. FIG. 1 illustrates a location awareness technique 100 for using global location, Satellite Based Augmentation System, and ambient country identification signals to automatically determine the country of operation for a WLAN device. In technique 100, step 101 can power up the WLAN device. After power up, the WLAN device can perform a short global location signal scan in step 102.

In one embodiment, a WLAN device can download global locating assistance information associated with one system. Global locating assistance information can be provided by GPS (Global Positioning System, developed and maintained by the United States), GLOSNASS (developed and being restored to operation by Russia), GALILEO (currently being developed by Europe), COMPASS (proposed by China), IRNSS (proposed by India), or any other system providing global satellite coverage. After the global locating assistance information is downloaded, the WLAN device can search for satellites in that system. If at least a predetermined number of satellites of that system (e.g. three for GPS) are found, then the WLAN device can decode their signals and determine the country of operation.

In one embodiment, if less than the predetermined number of satellites are found, then the WLAN device can download global locating assistance information from another system, e.g. GLONASS or GALILEO, and then search for satellites in that system. Thus, in general, this satellite search can be performed a specific number of times (i.e. for at least one system).

If the predetermined number of satellites (and their associated global location signals) in any one system cannot be found during an initial short scan (e.g. on the order of 60 seconds) to determine a country of operation, then the WLAN device can continue its global location signal scan for a longer period of time (e.g. at least 90 seconds) in step 107. In one preferred embodiment, this longer scan can include additionally searching for other radio signals uniquely present in a country or region. Exemplary radio signals could include SBAS and ACI signals.

An SBAS (Satellite Based Augmentation System) is a system providing signals that can augment an existing wide-area or regional satellite system. Exemplary SBAS signals can include, but are not limited to, WAAS, EGNOS, or MSAS. WAAS (Wide Area Augmentation System) was developed by the Federal Aviation Administration to augment GPS using both satellites and ground stations. WAAS can provide location data regarding most of the contiguous United States, Alaska, and most of Canada. Comparable SBASs can be found in Europe (i.e. EGNOS, European Geostationary Navigation Overlay Service, which was developed to augment GPS and GLONASS) and Japan (i.e. MSAS, Multi-functional Satellite Augmentation System, which was developed to augment GPS)). A WLAN device can search for one or more SBASs using known PRNs (each SBAS having an assigned pseudorandom number identification).

An ACI, as defined herein, is an ambient country identifier. In the U.S., an exemplary ACI signal is a Digital Audio Radio Service (DARS) signal. Notably, DARS signals in the relevant frequency bands are not present in Europe or Asia and no other country operates this service in the relevant frequency bands. Specifically, current WLAN receivers using existing 2.4 GHz or dual band 2.4+5 GHz antennas can receive a DARS signal, which can be found at 2.320-2.345 GHz.

Advantageously, DARS coverage is widespread across the U.S. in both urban and rural areas. Specifically, one of the two U.S. DARS licensees operates two geostationary orbit satellites located over the East and West coasts of the U.S. The second DARS licensee operates three satellites in elliptical orbits over North America.

Additionally, the DARS satellites include powerful transmitters that may beam 10 megawatts of equivalent transmitted power back to earth. Therefore, the WLAN device can easily detect DARS signals in either of the two sets of channels (i.e. in 2.320-2.3325 GHz or 2.3325-2.345 GHz) without the need for additional receivers or antennas.

To access (i.e. decode the programming of) a DARS signal, a WLAN device would need a "subscription" to the DARS service. However, in accordance with one embodiment, the WLAN device can simply detect the presence of a DARS signal in the expected frequency band without need of a subscription.

This detection can be performed even if the DARS signal is encoded. Moreover, current WLAN receivers can also be readily adapted to adequately receive other DARS signal types, e.g. DARS signals encoded with QPSK modulation using two channels occupying approximately 8.3 MHz of bandwidth or encoded with OFDM modulation from terrestrial repeaters using approximately 4.2 MHz of bandwidth. Because current WLAN receivers can demodulate QPSK and OFDM signals, WLAN chipsets and receiver algorithms can be readily extended to receive encoded DARS signals.

Specifically, IEEE 802.11g OFDM encoding of signals and DARS terrestrial signal C-OFDM encoding is substantially the same. C-OFDM encoding is a modulation scheme tailored to the digital broadcast of audio or video signals using forward error-correction coding. Similarly, IEEE 802.11g and 802.11b QPSK encoding of signals and DARS satellite signal QPSK encoding is substantially the same.

Because WLAN devices can already receive and detect OFDM and QPSK encoded signals, additional decoding algorithms and/or gates in WLAN device for receiving and detecting DARS encoded signals is unnecessary, thereby minimizing additional engineering and product cost. Moreover, because the DARS signal, irrespective of encoding, is transmitted in a known frequency band, the need to anticipate the particular encoding of the DARS signal is eliminated. In other words, the WLAN device can simply detect the presence of the DARS encoded signal within the expected frequency band. Advantageously, FCC conformance testing and/or regulatory approval of the WLAN device is not required for this detect-only function.

In step 107, the WLAN device can perform this longer scan, which includes the global location, the SBAS, and the ACI scans, for a predetermined period of time (e.g. at least 30 seconds). In one embodiment where the WLAN device is marketed in (and thus is operable in) multiple countries, the WLAN device can listen for multiple ACI signals in succession.

Note that ACI signals are typically transmitted in different frequency bands for different countries. Thus, if the WLAN device is powered on in Europe, then the WLAN device will not detect a DARS signal (i.e. the U.S. ACI signal) because the DARS signal is not present in 2.320-2.345 GHz channel in Europe.

If a global location signal or an ACI for a particular country is detected in step 108 or if a global location signal for a particular country is detected in step 103, then the WLAN device can be configured for that particular country in step 104.

In step 105, the WLAN device can "lock" itself to the channel and power settings required by the country of operation. In one embodiment, the WLAN device can communicate this country of operation to the end user (e.g. by using an LED, a console, or a Web interface). In one embodiment, the WLAN device can store a "flag" in non-volatile memory indicating that the WLAN device was automatically configured for a specific country of operation. At this point, the end user can power-off the WLAN device and relocate it as desired. Upon subsequent power-up, the WLAN device can detect the flag and confirm that operation in that country can commence.

This locking mechanism can also initiate certain protocols required by the country of operation and/or override any end user commands that could, unintentionally or intentionally, be inconsistent with the regulations of the country of operation. For example, locking the WLAN device to the U.S. could enable radar detection in 5.25-5.35 and 5.47-5.725 GHz as required by the FCC. In another embodiment, locking the WLAN device to the U.S. could disable 5 GHz ad-hoc operation in those same bands (also required by the FCC). Once the channel and power setting are locked, the WLAN device can commence normal operation in step 106.

If the WLAN device cannot determine a country of operation in step 108, then the WLAN device can still determine if a region of operation is identifiable based on any detected SBAS in step 109. If a region of operation is identifiable, then step 110 can configure the WLAN device to operate in the channel set applicable to that region. However, if a region of operation is not identifiable, then step 111 can revert to a default mode operation. In one embodiment, the WLAN device could use a specific default mode based on the region in which it is to be marketed.

For example, a default mode for WLAN devices marketed in Europe could be an "open mode" in which end users can configure the WLAN device by entering a country of operation. In this case, the WLAN device could allow an end user to view a country configuration menu, thereby allowing the end user to choose a country of operation. Note that the open mode is not allowed in some countries, e.g. the U.S. or Japan. Therefore, a default mode for WLAN devices marketed in the U.S. or Japan could be a "common mode".

Common mode operation can be defined as a default channel and transmit power configuration known to meet global spectrum usage requirements (i.e. is designed to meet regulatory requirements, regardless of location). The disadvantage of a device operating in common mode is that it cannot operate in additional channels or at higher power levels than may be allowed in its actual (but unknown) country of operation. Table 1 indicates exemplary common mode operation for WLAN devices.

TABLE 1

Common Mode Operation
Common Mode Operation for WLAN Access Point

| 2.4 GHz Channels | 5.15-5.35 GHz | 5.47-5.725 GHz | 5.725-5.850 GHz |
|---|---|---|---|
| IEEE Channels 1-11 | Disabled | Disabled | Disabled |

Tables 2-4 indicate channels and associated IEEE channels of operation for the U.S., Europe, and Japan, respectively.

TABLE 2

U.S. Operation
U.S. Operation for WLAN Access Point

| 2.4 GHz Channels | 5.15-5.35 GHz | 5.47-5.725 GHz | 5.725-5.850 GHz |
|---|---|---|---|
| IEEE Channels 1-11 | IEEE Channels 36-48 | IEEE Channels 100-140 | IEEE Channels 149-165 |

TABLE 3

European Community Operation
European Community Operation for WLAN Access Point

| 2.4 GHz Channels | 5.15-5.35 GHz | 5.47-5.725 GHz | 5.725-5.850 GHz |
|---|---|---|---|
| IEEE Channels 1-13 | IEEE Channels 36-48 | IEEE Channels 100-140 | Disabled |

TABLE 4

Japan Operation
Japan Operation for WLAN Access Point

| 2.4 GHz Channels | 5.15-5.35 GHz | 5.47-5.725 GHz | 5.725-5.850 GHz |
|---|---|---|---|
| IEEE Channels 1-14 | IEEE Channels 36-48 | Disabled | Disabled |

If the WLAN device configures itself for common mode operation, by definition the WLAN device would commence operation only using channels and power levels known to be legal in all countries. Although perhaps more limited in the channels or higher power levels than may be allowed in the country of operation, the common mode may ensure that the WLAN device (i.e. the access point and/or one of its associated clients) is operating legally.

In one embodiment of step 111, the WLAN device could also inform the end user that automatic configuration cannot occur and instruct the end user to temporarily relocate the WLAN device (e.g. to a location at higher elevation or to an area with clear access to the sky). In one embodiment, the WLAN device could use an LED display to perform this function. In other embodiments, the WLAN device could send a message to the end user using an access point console or a Web interface. Once relocated to a location more suitable for ACI signal reception, the WLAN device could be powered-up again in step 101.

After reverting to the default mode in step 111, the WLAN device can lock appropriate channel and power settings in step 105 and then commence normal operation in step 106. To reduce the risk of negative consequences in the open mode (i.e. interference caused by the access point to other users or negative action by the FCC) or to improve performance in the common mode, the WLAN device can be configured to periodically check for the ACI signal.

Figure 2:
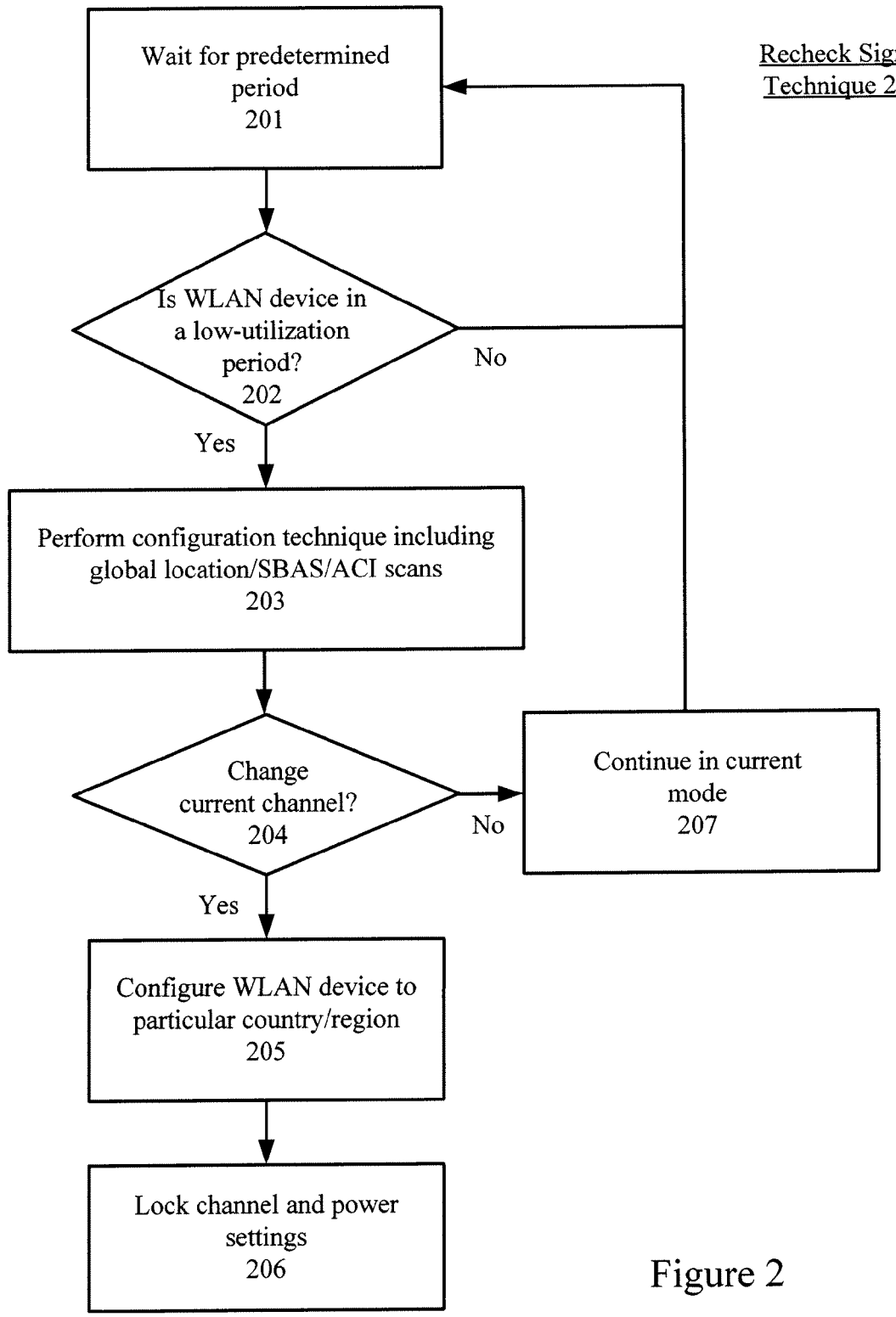
FIG. 2 illustrates an ACI signal recheck technique that can be periodically performed if the WLAN device is in a common mode, an open mode, or another default mode.

FIG. 2 illustrates a signal recheck technique 200 that can be performed if the WLAN device is in a common mode, an open mode, or another default mode. In step 201, the WLAN device can perform the recheck at regular intervals. In one embodiment, the predetermined wait period can be 12 hours. Step 202 determines whether a WLAN device is in a low-utilization period, thereby minimizing impact to standard operation of the WLAN device. If not, then the WLAN device can return to step 201. In one embodiment, the predetermined wait period following step 202 can be significantly shorter than the initial period, e.g. on the order of 0.5 hours. If the WLAN device is in a low-utilization period, then the WLAN device can temporarily pause its operation and initiate the longer global location/SBAS/ACI scans in step 203 (wherein such scan would be substantially similar to that performed by step 107, FIG. 1). In one embodiment, the WLAN device can continue this scan until utilization/demand increases over a pre-determined threshold, at which time the WLAN device can stop the scan and repeat it at a later point in time (e.g. 12 to 24 hours later). In step 204, if the WLAN device detects the signals identifying a particular country or region of operation and that particular country/region has an associated set of channels different than what the WLAN device is currently using, then the channel and power settings can be configured to that country/region of operation in step 205.

In step 206, the WLAN device can "lock" itself to the channel and power requirements conforming to the designated country/region of operation. As described previously, this locking mechanism can initiate certain protocols required by the country of operation and/or override any end user commands that could, unintentionally or intentionally, be inconsistent with the regulations of the country of operation.

If the WLAN device does not detect at least one of a global location signal, an SBAS signal, and an ACI signal in step 204, then the WLAN device can continue using its current channel and power settings in step 207 and then return to step 201 to wait for a predetermined period of time. In one embodiment, this period of time can be set to the initial interval period (e.g. 12 hours).

Recheck technique 200 can advantageously prevent an end user from intentionally initializing the WLAN device in a location known to have inadequate reception of the ACI signals or perhaps removing the transmit antenna of the WLAN device, thereby defeating the automatic configuration of the WLAN device. Recheck technique 200 can also improve performance of a WLAN device that is initially configured for the common mode. That is, once the global location/SBAS/ACI signal is detected, the channel and power settings of the actual country/region of operation can be used, which generally provide for additional channels and higher power settings.

Note that if an end user is legitimately located in an area with extreme geographic features or located underground where both terrestrial repeaters and satellite signals cannot be received, then logically, the risk of the WLAN device causing interference to other licensed services due to incorrect channel settings is greatly reduced because reception and transmission gains of the WLAN device are reciprocal. For example, if reception of the ACI signal is completely blocked in the 2.3 GHz band, then possibly interfering signals caused by the WLAN device due to operation on "illegal" channels in the U.S. (such as 2.497 GHz=802.11b/g IEEE channel 14) are likely to be equally attenuated.

Reception of DARS signal in Canada

Note that because the DARS satellites may provide coverage over portions of Canada, it is possible that WLAN devices sold in Canada could be automatically configured for U.S. operation instead. Fortunately, this U.S. configuration is acceptable in Canada as the channel and power settings for Canada are more relaxed or the same as those for the U.S.

Moreover, Canada is in the process of updating its 5 GHz spectrum allocation for WLAN devices so that the recently opened 5.47 GHZ U-NII band in the U.S. will also be available in Canada. In this particular sub-band, the case of a U.S.-configured WLAN device operating in Canada poses no risk to licensed users or government or civilian radar systems operating in this band. Specifically, a WLAN device configured for U.S. operation in the 5.47 GHz band will implement Dynamic Frequency Selection (DFS), which can protect against co-channel operation with radar systems irrespective of location in the U.S. or Canada.

WLAN Hardware

To implement the start-up technique 100 shown in FIG. 1, the WLAN device can use a tri-band (e.g. 1.5/2.4/5 GHz) antenna. In one embodiment, this tri-band antenna can be formed by combining a WiFi antenna and, for example, a GPS antenna. Note that the GPS radio can be shared with the WiFi radio with proper frequency planning so that the radio can be configured to receive GPS signals at startup and later switched back to WiFi. In one embodiment, the GPS calculation(s) can be done by a processor in the WiFi, thereby eliminating the need for additional hardware (i.e. other than the antenna).

WLAN Software

Location awareness technique 100 (FIG. 1) and recheck signal technique 200 (FIG. 2) can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Other Embodiments

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, as described above, global location/SBAS/ACI signal detection can be applied equally to access points and clients. Note that applying global location/SBAS/ACI identification to clients can advantageously reduce the risk posed by association with an access point not having location awareness.

Note that although a specific ACI signal is discussed herein, other ACI signals can be present in different countries. In general, a candidate ACI signal type can include the following criteria. The ACI signal should be within (or nearby) WLAN operating frequencies, thereby allowing that ACI signal to be detected by WLAN receiver technology without significant additional engineering effort. Additionally, the ACI signal should be uniquely present in a country or region. Preferably, the ACI signal is widely present geographically within the country (or region) and is operational for a known time period.

In one embodiment, a technique for discontinuing the use of a particular SBAS/ACI signal can be provided. For example, in one embodiment, a sunset period could be built into the software if, at time of manufacture, it is known that the particular SBAS/ACI signal will be discontinued. This time period could be stored in non-volatile memory. Once the use of that SBAS/ACI signal is discontinued, another SBAS/ACI signal (which could also be stored in non-volatile memory, if known) could be used. In one embodiment, if the periodic recheck for a particular SBAS/ACI signal is unsuccessful after a predetermined number of tries, then a search for an alternative SBAS/ACI signal can be performed.

In another embodiment, an automatic, secure update service (e.g. a service provided via the Internet) can provide the access point with an update to the SBAS/ACI signal list/table or to the SBAS/ACI algorithm. This update can be triggered by changes in the availability of certain SBAS/ACI signals in one or more countries and/or changes to regulatory rules for allowed channels/powers.

Accordingly, it is intended that the scope of the invention be defined by the following Claims and their equivalents.

The invention claimed is:

1. A method of automatically providing location awareness for a WLAN device, the method comprising:

performing a first scan for a set of global location signals, wherein the set of global location signals is at a frequency within an operating range of a receiver of the WLAN device;

configuring the WLAN device for compliance with a country having the set of global location signals when the set of global location signals is detected during the first scan;

performing a second scan for the set of global location signals, an SBAS (Satellite Based Augmentation System) signal, and an ACI (ambient country identifier) signal when the set of global location signals is not detected during the first scan, wherein the second scan is longer than the first scan, wherein the SBAS signal and the ACI signal are at frequencies within the operating range of the receiver of the WLAN device;

configuring the WLAN device for compliance with a country having the set of global location signals when the set of global location signals is detected during the second scan;

configuring the WLAN device for compliance with a country having the ACI signal when the ACI signal is detected during the second scan; and configuring the WLAN device for compliance with a region having the SBAS signal when the SBAS signal is detected during the second scan.

2. The method of claim 1, further including:

configuring the WLAN device for one of a common mode and an open mode if the first and second scans do not detect the set of global location signals, the SEAS signal, or the ACI signal.

3. The method of claim 1, wherein if the ACI signal is a Digital Audio Radio Service (DARS) signal, then configuring the WLAN device for U.S. operation.

4. The method of claim 1, wherein configuring includes locking the WLAN device to the country/region based on at least one of the set of global location signals, the SBAS signal, and the ACI signal.

5. The method of claim 4, wherein locking includes programming non-volatile memory of the WLAN device to retain current channel and power settings.

6. The method of claim 5, wherein locking includes initiating a protocol required by the country/region.

7. The method of claim 6, wherein the protocol includes enabling radar detection.

8. The method of claim 5, wherein locking includes overriding any end user commands that could be inconsistent with regulations of the country/region.

9. The method of claim 8, wherein overriding any end user commands includes disabling ad-hoc operation of the WLAN device in a predetermined frequency band.

10. A method of operating a WLAN device in one of a common mode or an open mode, the method comprising:
determining whether the WLAN device is in a low-utilization period;
when the WLAN device is in the low-utilization period, performing a first scan;
determining whether a country of operation can be determined based on the first scan, the first scan limited to searching for global location signals;
when the country of operation cannot be determined based on the global location scan, performing a second scan, the second scan searching for a set of global location signals, an SBAS (Satellite Based Augmentation System) signal, and an ambient country identifier (ACI) signal, wherein the set of global location signals, the SEAS signal and the ACI signal are at frequencies within an operating range of a receiver of the WLAN device; and
configuring the WLAN device for compliance with spectrum usage rules for a country/region when at least one of the set of global location signals, the SBAS signal, and the ACI signal are detected during the second scan.

11. The method of claim 10, wherein if the WLAN device is not in a low-utilization period, then waiting a predetermined period before performing the first scan.

12. The method of claim 10, wherein if at least one of the set of global location signals, the SEAS signal, and the ACI signal are not detected, then continuing operation of the WLAN device in its current mode.

13. The method of claim 12, wherein after continuing operation, the method further including the step of waiting a predetermined period before performing another scan.

14. The method of claim 10, wherein configuring includes locking the WLAN device to the country/region based on at least one of the set of global location signals, the SBAS signal, and the ACI signal.

15. The method of claim 14, wherein locking includes programming non-volatile memory of the WLAN device to retain current channel and power settings.

16. The method of claim 15, wherein locking includes initiating a protocol required by the country/region.

17. The method of claim 16, wherein the protocol includes enabling radar detection.

18. The method of claim 15, wherein locking includes overriding any end user commands that could be inconsistent with regulations of the country/region.

19. The method of claim 18, wherein overriding any end user commands includes disabling ad-hoc operation of the WLAN device in a predetermined frequency band.

20. A non-transitory computer-readable medium storing computer-executable instructions for automatically providing location awareness for a WLAN device, which when executed by a computer performs steps of:
performing a first scan for a set of global location signals, wherein the set of global location signals is at a frequency within an operating range of a receiver of the WLAN device;
configuring the WLAN device for compliance with a country having the set of global location signals when the set of global location signals is detected during the first scan;
performing a second scan for the set of global location signals, an SEAS (Satellite Based Augmentation System) signal, and an ACI (ambient country identifier) signal when the set of global location signals is not detected during the first scan, wherein the second scan is longer than the first scan, wherein the SBAS signal and the ACI signal are at frequencies within the operating range of the receiver of the WLAN device;
configuring the WLAN device for compliance with a country having the set of global location signals when the set of global location signals is detected during the second scan;
configuring the WLAN device for compliance with a country having the ACI signal when the ACI signal is detected during the second scan; and
configuring the WLAN device for compliance with a region having the SEAS signal when the SBAS signal is detected during the second scan.

21. The computer-readable medium of claim 20, further including:
configuring the WLAN device for one of a common mode and an open mode if the first and second scans do not detect the set of global location signals, the SEAS signal, or the ACI signal.

22. The computer-readable medium of claim 20, wherein if the ACI signal is a Digital Audio Radio Service (DARS) signal, then configuring the WLAN device for U.S. operation.

23. The computer-readable medium of claim 20, wherein configuring includes locking the WLAN device to the country/region based on at least one of the set of global location signals, the SEAS signal, and the ACI signal.

24. The computer-readable medium of claim 23, wherein locking includes programming non-volatile memory of the WLAN device to retain current channel and power settings.

25. The computer-readable medium of claim 24, wherein locking includes initiating a protocol required by the country/region.

26. The computer-readable medium of claim 25, wherein the protocol includes enabling radar detection.

27. The computer-readable medium of claim 24, wherein locking includes overriding any end user commands that could be inconsistent with regulations of the country/region.

28. The computer-readable medium of claim 27, wherein overriding any end user commands includes disabling ad-hoc operation of the WLAN device in a predetermined frequency band.

29. A non-transitory computer-readable medium storing computer-executable instructions for operating a WLAN device in one of a common mode or an open mode, which when executed by a computer performs steps of:
determining whether the WLAN device is in a low-utilization period;
when the WLAN device is in the low-utilization period, performing a first scan;

determining whether a country of operation can be determined based on the first scan, the first scan limited to searching for global location signals;

when the country of operation cannot be determined based on the global location scan, performing a second scan, the second scan searching for a set of global location signals, an SBAS (Satellite Based Augmentation System) signal, and an ambient country identifier (ACI) signal, wherein the set of global location signals, the SEAS signal and the ACI signal are at frequencies within an operating range of a receiver of the WLAN device; and configuring the WLAN device for compliance with spectrum usage rules for a country/region when at least one of the set of global location signals, the SEAS signal, and the ACI signal are detected during the second scan.

30. The computer-readable medium of claim 29, wherein if the WLAN device is not in a low-utilization period, then waiting a predetermined period before performing the first scan.

31. The computer-readable medium of claim 29, wherein if at least one of the set of global location signals, the SBAS signal, and the ACI signal are not detected, then continuing operation of the WLAN device in its current mode.

32. The computer-readable medium of claim 31, wherein after continuing operation, the method further including the step of waiting a predetermined period before performing another scan.

33. The computer-readable medium of claim 29, wherein configuring includes locking the WLAN device to the country/region based on at least one of the set of global location signals, the SBAS signal, and the ACI signal.

34. The computer-readable medium of claim 33, wherein locking includes programming non-volatile memory of the WLAN device to retain current channel and power settings.

35. The computer-readable medium of claim 34, wherein locking includes initiating a protocol required by the country/region.

36. The computer-readable medium of claim 35, wherein the protocol includes enabling radar detection.

37. The computer-readable medium of claim 35, wherein locking includes overriding any end user commands that could be inconsistent with regulations of the country/region.

38. The computer-readable medium of claim 37, wherein overriding any end user commands includes disabling ad-hoc operation of the WLAN device in a predetermined frequency band.

* * * * *